United States Patent
Berge et al.

(10) Patent No.: US 10,423,809 B2
(45) Date of Patent: *Sep. 24, 2019

(54) LOCATION SENSING FOR ANALYTICAL APPLICATIONS

(71) Applicant: International Business Machines Corporation, Armonk, NY (US)

(72) Inventors: Layne A. Berge, Rochester, MN (US); John R. Dangler, Rochester, MN (US); Matthew S. Doyle, Chatfield, MN (US); Thomas W. Liang, Rochester, MN (US); Manuel Orozco, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 15/783,591

(22) Filed: Oct. 13, 2017

(65) Prior Publication Data

US 2018/0039800 A1 Feb. 8, 2018

Related U.S. Application Data

(63) Continuation of application No. 14/884,396, filed on Oct. 15, 2015, now Pat. No. 9,805,229.

(51) Int. Cl.
*G06K 7/10* (2006.01)
*G01S 13/74* (2006.01)
(Continued)

(52) U.S. Cl.
CPC .......... *G06K 7/10217* (2013.01); *G01S 13/74* (2013.01); *G06K 7/10099* (2013.01);
(Continued)

(58) Field of Classification Search
None
See application file for complete search history.

(56) References Cited

U.S. PATENT DOCUMENTS 7,439,862 B2 10/2008 Quan
9,805,229 B2 * 10/2017 Berge ..................... G01S 13/74
(Continued)

FOREIGN PATENT DOCUMENTS

| CN | 202693045 U | 1/2013 |
| EP | 0986178 A2 | 3/2000 |

(Continued)

OTHER PUBLICATIONS

List of IBM Patents or Applications Treated as Related.
(Continued)

*Primary Examiner* — Daniell L Negron
(74) *Attorney, Agent, or Firm* — Patterson + Sheridan, LLP (57) ABSTRACT

Embodiments herein describe RFID systems that include multiple RFID tag readers that each use a different frequency to communicate with an RFID tag. For example, each of the tag readers may transmit a tag query command using different modulated frequencies. In one embodiment, the RFID tag includes multiple receivers each tuned to one of the different frequencies generated by the tag readers. For example, one receiver in the tag is tuned to receive 200 MHz signals while another receiver is tuned to receive 900 MHz signals. To provide location information, the RFID tag compares power values associated with the received signals to determine which of the RFID tag readers is closest to the tag. The RFID tag conveys this location information to the tag readers by selecting one of the frequencies of the tag readers to use when generating a reply message.

20 Claims, 4 Drawing Sheets

(51) Int. Cl.
*G06K 19/07* (2006.01)
*G01S 5/02* (2010.01)

(52) U.S. Cl.
CPC ..... *G06K 7/10128* (2013.01); *G06K 19/0724* (2013.01); *G01S 5/02* (2013.01); *G06K 7/10158* (2013.01)

(56) References Cited

U.S. PATENT DOCUMENTS

| | | | |
|---|---|---|---|
| 9,824,247 B2 * | 11/2017 | Berge | ............... G01S 13/74 |
| 2001/0048361 A1 | 12/2001 | Mays et al. | |
| 2004/0212500 A1 | 10/2004 | Stilp | |
| 2005/0093701 A1 | 5/2005 | Hollon | |
| 2005/0110674 A1 | 5/2005 | Mendolia et al. | |
| 2007/0046369 A1 | 3/2007 | Schober et al. | |
| 2007/0194933 A1 | 8/2007 | Shanks et al. | |
| 2008/0055091 A1 | 3/2008 | Song et al. | |
| 2011/0068987 A1 | 3/2011 | Carr | |

FOREIGN PATENT DOCUMENTS

| | | |
|---|---|---|
| EP | 2287777 A1 | 2/2011 |
| TW | 1270012 B | 1/2007 |
| TW | 201407488 A | 2/2014 |
| WO | 2011094750 A1 | 8/2011 |

OTHER PUBLICATIONS

U.S. Appl. No. 14/885,146, entitled Location Sensing for Analytical Applications, filed Oct. 16, 2015.

Trotter, Matthews. et al., Range Estimation for Passive RFID Systems That Use Power-Optimized Waveforms, 2012 IEEE International Conference on RFID, 2012, pp. 102-109, IEEE, Piscataway, United States.

RFID Credit Card Tags, retrieved Oct. 14, 2015, 4 pages, SkyRFID Inc., <http://skyrtid.com/RFID_Credit_Card_Tag.php>.

Skinner, Nicholas, Building An Active RFID People I Asset Tracking System With Mesh Networking, Nicholas Skinner Freelance website and web application developer, 2008, 34 pages, retrieved Oct. 15, 2015, <http:/fwww.ns-tech.co. u k/blog/201 0/02/active-rtid-tracki ng-system/>.

Costin, Aaron, Integration of Passive RFID Location Tracking for Real-Time Visualization in Building Information Models (BIM): A Thesis Presented to The Academic Faculty, Dec. 2013, pp. 1-62, Georgia Institute of Technology, Atlanta, United States.

Armstrong, Shain, RFIDinsider: Tracking the RFID Industry, retrieved Oct. 15, 2015, 6 pages, <http:/fblog.atlasrfidstore. com/understand ing-epc-gen-2-search-modes-and-sessions>.

U.S. Appl. No. 14/884,396, entitled Location Sensing for Analytical Applications, filed Oct. 15, 2015.

* cited by examiner

LOCATION SENSING FOR ANALYTICAL APPLICATIONS

CROSS-REFERENCE TO RELATED APPLICATIONS

This application is a continuation of co-pending U.S. patent application Ser. No. 14/884,396, filed Oct. 15, 2015. The aforementioned related patent application is herein incorporated by reference in its entirety.

BACKGROUND

The present invention relates to radio frequency identification (RFID) tags, and more specifically, to generating location information using multiple transmission frequencies.

Typical RFID tags include an integrated circuit (IC) functionally connected to an antenna. The IC stores unique data for identifying a specific item or user associated with the RFID tag. The IC also modulates a radio frequency (RF) signal that is transmitted or backscattered via the antenna. An external tag reader captures the data signal transmitted by the RFID tag.

RFID tags can be classified as "active" or "passive" devices. Active tags use an internal power source to actively transmit a modulated signal to the tag reader. Passive tags, in contrast, do not actively transmit modulated signals to the tag reader but modulate the electromagnetic waves scattered from the tag's antenna. The signal that is scattered originates from the tag reader. Passive RFID tags are powered by the incident signal transmitted by the tag reader. Passive tags are typically less expensive than active tags but have shorter functional ranges than active RFID tags. RFID tags typically operate in the ultra-high frequency (UHF) or microwave frequency bands.

In some cases, the external tag reader may determine the distance between the reader and the RFID tag. Conventional ranging techniques, such as received signal strength indication (RSSI) for either active or passive RFID tags, work over relatively large areas but suffer from poor accuracy. Time of flight or frequency modulated continuous wave radar may also be used to determine the separation distance but these techniques work poorly for short distance applications because of the difficulties of measuring the small round trip time or frequency delay.

SUMMARY

One embodiment of the present invention is a method of operating a RFID tag. The method includes receiving a first RF identification (RFID) signal at the RFID tag at a first frequency and receiving a second RFID signal at the RFID tag at a second frequency different from the first frequency. The method includes generating respective power values indicating the signal strengths of the first and second RFID signals and determining, based on the respective power values, which of the first and second RFID signals has the greater signal strength. The method includes transmitting a reply message from the RFID tag using a frequency corresponding to the first or second RFID signal with the greater signal strength.

Another embodiment of the present invention is an RFID tag that includes a first receiver tuned to receive a first RFID signal where the first receiver is configured to generate a first power value indicating a signal strength of the first RFID signal and a second receiver tuned to receive a second RFID signal where the second receiver is configured to generate a second power value indicating a signal strength of the second RFID signal. Moreover, the first and second receivers are tuned to different frequencies. The RFID tag includes a comparator configured to determine which of the first and second RFID signals has a greater signal strength based on the first and second power values and a transmitter configured to transmit a reply message using a frequency corresponding to the first or second RFID signal with the greater signal strength.

Another embodiment of the present invention is an RFID system that includes a first tag reader configured to transmit a first RFID signal using a first frequency and a second tag reader configured to transmit a second RFID signal using a second frequency different from the first frequency. The RFID system includes a RFID tag that includes at least one receiver configured to receive the first RFID signal and the second RFID signal. The RFID tag also includes logic configured to select, in response to receiving the first and second RFID signals, one of the first and second frequencies by determining which of the first or second RFID signal has the greater signal strength and output a reply message comprising a tag ID using the selected frequency.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments herein describe an RFID system that includes multiple RFID tag readers that each use a different frequency to communicate with an RFID tag. For example, each of the tag readers may transmit a tag query command using different modulated frequencies. In one embodiment, the RFID tag includes multiple receivers that are each tuned to receive one of the different frequencies generated by the tag readers. For example, one receiver in the tag is tuned to receive 200 MHz signals while another receiver is tuned to receive 900 MHz signals. Moreover, the receivers in the RFID tag may include respective power sources that generate power from the signals received from the tag readers. In one embodiment, the power sources generate a power value that corresponds to each of the received frequencies—e.g., 200 and 900 MHz. These power values are used to determine a location of the RFID tag relative to the tag readers.

To generate location information, the RFID tag compares the power values generated by the power sources to determine which of the RFID tag readers is closest to the tag. For example, if the power source on the tag that tuned to 200 MHz signals generates more power than the power source tuned to 900 MHz signals, the RFID tag determines it is closer to the RFID tag reader outputting the 200 MHz signal than the tag reader outputting the 900 MHz. In response, the RFID tag can generate a reply message at or near 200 MHz which indicates to the tag readers that the RFID tag is closest to the reader outputting the 200 MHz signal. That is, to convey location information, the RFID tag outputs a reply message using the frequency that generated the highest power value in the tag. By detecting the reply message, the tag reader can determine whether the RFID tag is within its region or zone.

Figure 1:
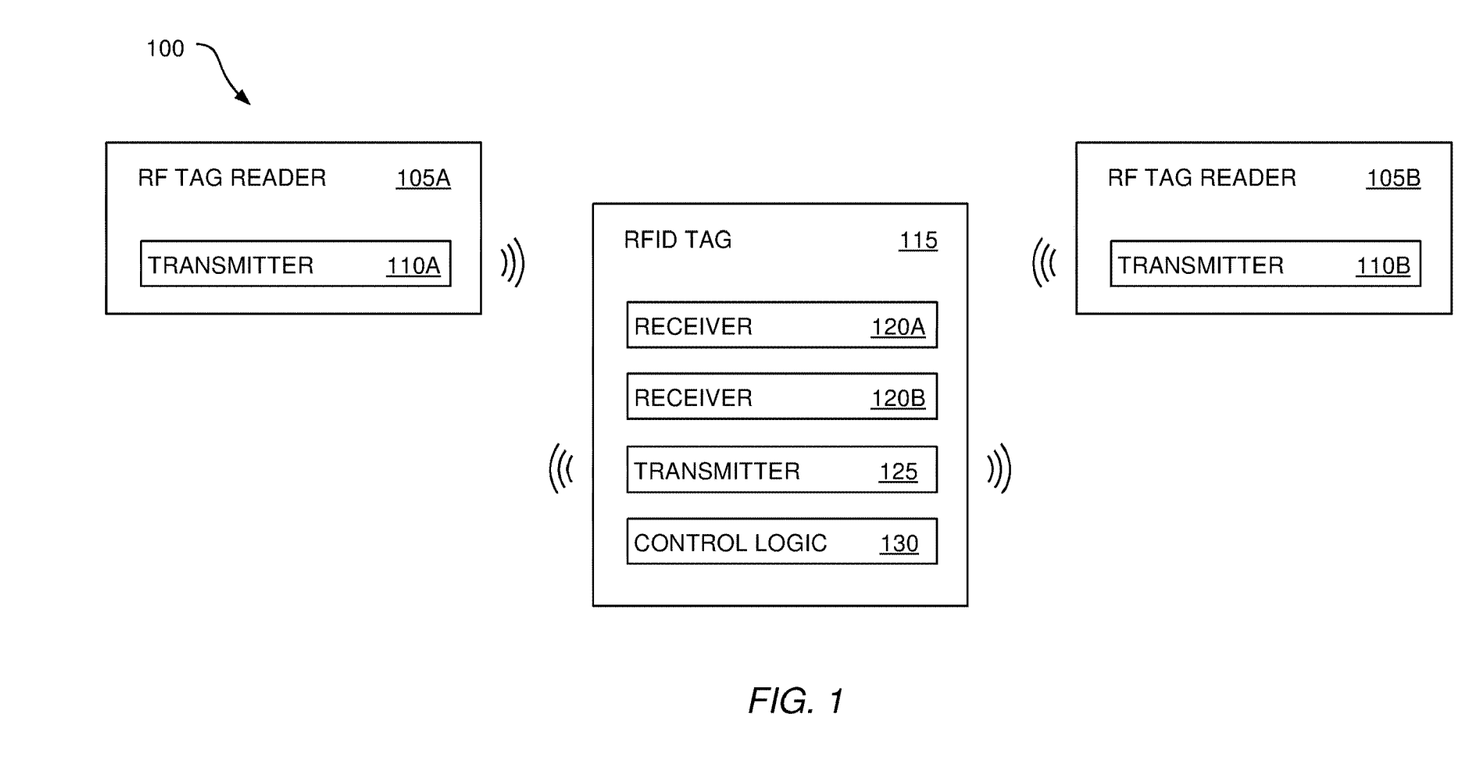
FIG. 1 illustrates an RFID system that uses multiple frequencies to communicate with an RFID tag, according to one embodiment disclosed herein.

FIG. 1 illustrates an RFID system 100 that uses multiple frequencies to communicate with an RFID tag 115, according to one embodiment disclosed herein. The RFID system 100 includes two RFID tag readers 105A and 105B that each includes respective transmitters 110. In one example, the tag readers 105 transmit messages using different frequencies. For example, the transmitters 110 in each tag reader 105 may transmit tag query commands using different frequencies to determine whether the RFID tag 115 is in range. Although the embodiments herein recite that the tag readers 105 use different frequencies (e.g., 200 and 900 MHz), the readers 105 may use different (non-overlapping) frequency ranges. For example, transmitter 110A may use the frequency range 190-210 MHz to generate a modulated data signal—e.g., a tag query command—to the RFID tag 115, while transmitter 110B uses the frequency range 890-910 MHz to generate modulated data signals.

The RFID tag 115 includes multiple receivers 120, a transmitter 125, and control logic 130. In this example, the tag 115 includes two receivers 120 that correspond to the two tag readers 105. The receivers 120 are each tuned to one of the frequencies outputted by the tag readers 105. For example, receiver 120A may be designed to receive 200 MHz signals generated by tag reader 105A, while receiver 120B is designed to receive 900 MHz signals generated by tag reader 105B. However, the RFID system 100 may include more than two tag readers 105 which output signals at unique frequencies which means the RFID tag 115 may include more than two receivers 120.

In another embodiment, the RFID tag 115 may include a single receiver for receiving the different frequency signals transmitted by the tag readers 105. Put differently, rather than having two distinct receivers that are tuned to the different frequencies of the tag readers 105, the RFID tag 115 includes one receiver for receiving all the frequencies emitted by the tag readers 105. For example, the receiver may include an internal phase locked loop (PLL) that locks to whatever tag reader frequency is the strongest and provides that information to the control logic 130. Thus, the circuit elements in the PLL compares power values corresponding to the received tag reader signals and selects which of the signals has the greater signal strength.

In one embodiment, the control logic 130 compares power values generated by the receivers 120 to determine which frequency corresponds to the greater power value. As will be discussed in greater detail below, the receivers 120 may include AC-DC converters, voltage or current supplies, charge pumps, and the like which generate power values using the signals from the received from the transmitters 110 in the tag readers 105. For example, the receivers 120 may take the AC modulated RF signals and convert these signals into power values such as a DC voltage or current. The control logic 130 determines the receiver 120 that outputs the greatest power value thereby indicating which tag reader 105 is closer to the RFID tag 115.

Once the closest reader is identified, the control logic 130 instructs the transmitter 125 to transmit a reply message using the frequency corresponding to the closest tag reader 105. For example, if tag reader 105B (which transmits a 900 MHz signals) is the closest, than the transmitter 125 outputs the reply message using a 900 MHz modulated signal. Put differently, the control logic 130 can selectively control the transmitter 125 to output a reply message on any of the frequencies used by the tag readers 105 in the RFID system 100. Thus, when the tag reader 105B receives the reply message generated using a 900 MHz signal, the reader 105B knows the tag 115 is closer to it than to the tag reader 105A. In this manner, the tag 115 can transmit location information to the readers 105.

One advantage of selectively controlling the transmitter is that doing so may avoid problems associated with multi-path reflections. For example, when the tag 115 transmits (or backscatters) the reply message, this message may reflect off different surfaces in the environment which causes multi-path signals to reach the readers 105. The tag readers 105 may receive multiple delayed copies of the same reply message because of these multi-path signals. These delayed copies make determining the location of the RFID tag 115 difficult. However, because the embodiments herein selectively control the frequency at which the tag 115 modulates the received signals, even if a tag reader 105 receives multiple delayed copies of the reply message, the reader 105 can determine if it is the closest reader to the tag 115 by determining if the modulation frequency used by the tag 115 to generate the reply message is the same as its transmission frequency used to output, for example, tag query commands.

If the tag 115 is moved such that it is now closer to tag reader 105A than tag reader 105B, the control logic 130 in the tag 115 can detect this change in location by identifying that the power value generated by the receiver 120 tuned to the output frequency of tag reader 105A is now greater than the power generated by the receiver 120 tuned to the output frequency of tag reader 105B. In response, the control logic 130 instructs the transmitter 125 to stop using the 900 MHz signal to generate the reply messages and instead send messages using the frequency corresponding to tag reader 105A—e.g., 200 MHz. In this manner, the tag 115 provides updated location information as its location relative to the tag readers 105 changes.

Figure 2:
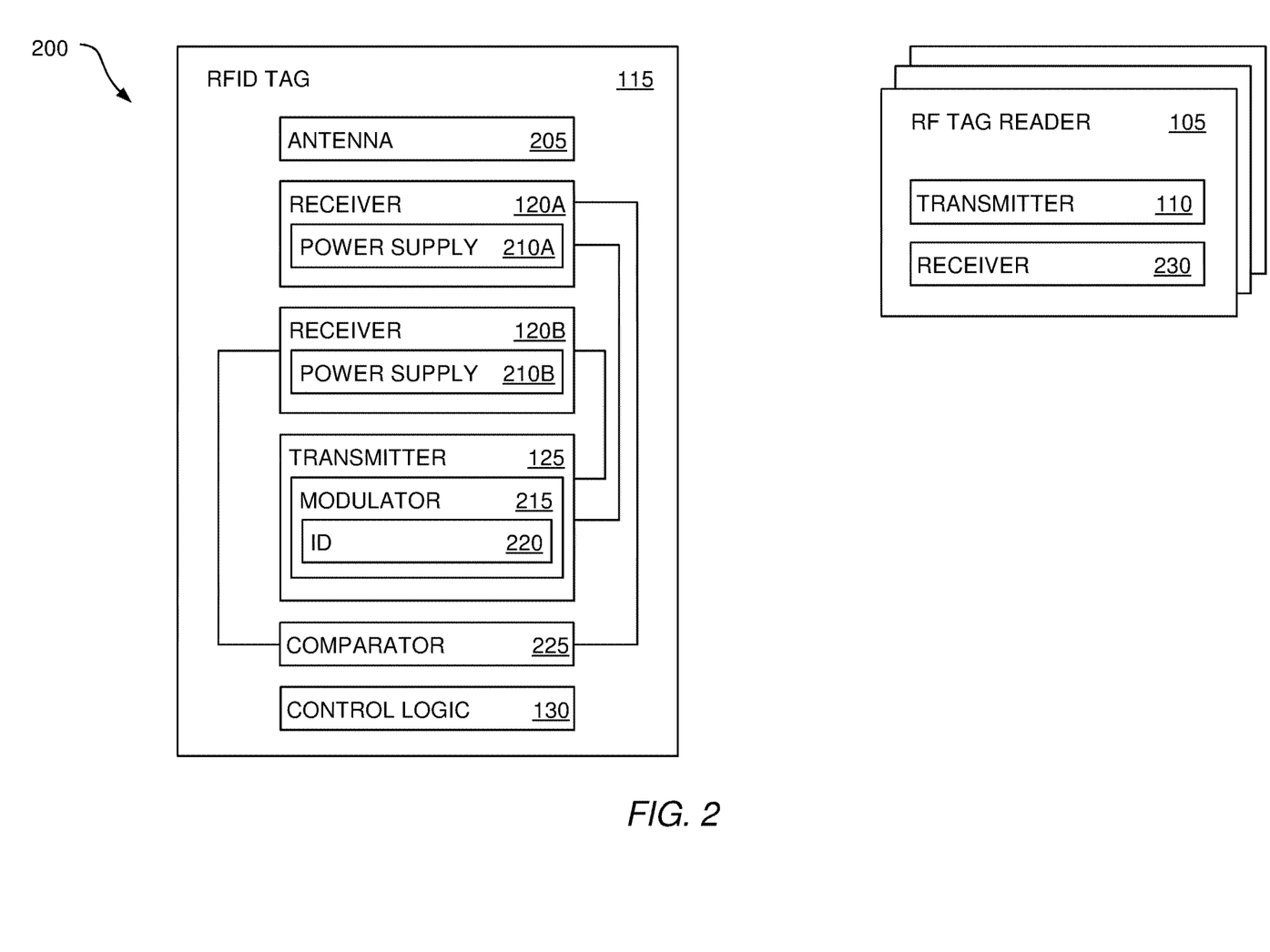
FIG. 2 illustrates an RFID system that uses multiple frequencies to communicate with an RFID tag, according to one embodiment disclosed herein.

FIG. 2 illustrates an RFID system 200 that uses multiple frequencies to communicate with the RFID tag 115, according to one embodiment disclosed herein. The RFID system includes RFID tag 115 and RFID tag reader 105. The tag reader 105 includes a transmitter 110 and receiver 230. In one embodiment, the transmitter 110 transmits messages to the RFID tag 115 using only one frequency. In one embodiment, the receiver 230 can receive reply messages from the RFID tag 115 only on the same transmission frequency used by the transmitter 110. For example, the transmitter 110 may transmit query commands only at 200 MHz while the receiver 230 can only receive messages at that same frequency—i.e., 200 MHz. Having a receiver 230 that can only receive data at the same frequency as the transmission frequency may reduce the cost of the tag reader 105.

Alternatively, the tag reader 105 may have a receiver 230 that can receive messages at multiple frequencies, even if those frequencies are outside the bandwidth of the transmitter 110—e.g., the receiver 230 may be able to receive data messages sent by the RFID tag 115 at 200 MHz and 900 MHz. Advantages for including a receiver 230 that can receive messages at frequencies other than the transmission frequency used by the transmitter 110 are discussed later.

The RFID tag 115 includes at least one antenna 205, multiple receivers 120, the transmitter 125, a comparator 225, and the control logic 130. In one embodiment, the receivers 120 share the same wideband antenna 205 for receiving data messages sent by tag readers 105 at different frequencies. Alternatively, each receiver 120 may be coupled to a respective antenna designed to receive signals at the same frequencies at which the receivers 120 are tuned. Moreover, the transmitter 125 may use the same antenna 205 (or antennas) used by the receivers 120 or the tag 115 may include a separate transmitter antenna for transmitting reply messages to the RFID tag readers 105.

In this example, the RFID tag 115 is a passive tag that uses power captured from the RF signals transmitted by the tag readers 105 to power its internal components (e.g., the transmitter 125, comparator 225, control logic 130, etc.) to generate and transmit reply messages to the tag readers 105. However, in other embodiments, the tag 115 may be an active or semi-passive tag that includes an independent power source—e.g., a battery. Even if the power source is used to transmit the reply messages, the comparator 225 can still compare a power value (e.g., signal strength) measured by each of the receivers 120 to determine which tag reader 105 is closest to the RFID tag 115. The control logic 130 can then instruct the transmitter 125 to generate a reply message using the frequency corresponding to the closest tag reader 105 as discussed above.

Because the tag 115 in FIG. 2 is passive, the receivers 120 each includes respective power supplies 210 which generate power values from the signals received from the tag readers 105. For example, the power supplies 210 may include AC-DC converters such as charge pumps (e.g., a Dickson charge pumps) which convert the AC signals into a DC voltage and/or current. The power values generated by the power supplies 210 may then be used to power the transmitter 125, comparators 225 and control logic 130. In one embodiment, the power supplies 210 may share the same circuit design although the individual electrical values or sizes of the circuit elements in the supplies 210 may vary in order to tune the power supplies 210 to different frequencies.

The transmitter 125 includes a modulator 215 which modulates the received signal to generate a reply message. In one embodiment, the transmitter 125 and modulator 215 use a backscatter technique to reflect and modulate the incident signals generated by the tag readers 105 to transmit data back to the tag readers 105. As shown, the modulator 215 includes an ID 220 that may be stored in a non-volatile memory element in the tag 115. When replying to a tag query command, the modulator 215 modulates the received signal to include the ID 220. Thus, when the modulated signal reflected or backscattered by the RFID tag 115 reaches the tag reader 105, the receiver 230 demodulates the signal and identifies the ID 220. In this manner, the tag reader 105 can identify the tag 115. In one embodiment, the ID 220 may be a product ID for tracking a product to which the tag 115 is attached, a user ID corresponding to a badge that includes the tag 115, a vehicle ID in which the tag 115 is placed, and the like. In this manner, the tag reader 105 can transmit tag query commands which are then used by the tag 115 to generate modulated reply messages that include the ID 220.

In addition to providing the ID 220, the tag 115 may also transmit different information in response to other commands transmitted by the tag reader 105. For example, the tag 115 may transmit security or access codes, a product expiration date (for perishable foods), timestamps, and the like in response to commands transmitted by the tag reader 105.

The comparator 225 receives the power values generated by the receivers 120 and determines which value is the greatest. In one embodiment, the power values are a voltage or current that is generated by the power supplies 210. Generally, the greater the signal strength of the signal received by the RFID tag 115, the greater the power values generated by the power supplies 210. As such, although voltage or current are specifically mentioned, the power values may be any indicator of the signal strength of the signals transmitted by the tag readers 105 to the RFID tag 115. By comparing the power values, the comparator 225 generates an output indicating which of the tag readers 105 is closer to the RFID tag 115. The comparator 225 may include hardware elements such as CMOS circuitry for determining which power value is the greatest. In other embodiments, the comparator 225 may include a firmware or software operation executed in an IC on the tag 115.

Using the output of the comparator 225, the control logic 130 instructs the modulator 215 to generate the reply message using the frequency that corresponds to the closest tag reader 105. That is, if the tag 115 receives signals at two different frequencies, the control logic 130 instructs the modulator 215 to modulate the signal to include the ID 220 at the frequency of the tag reader 105 that is closest to the tag 115. For example, if the tag 115 receives signals at 200 and 900 MHz but the 200 MHz signal corresponds to a greater power value, the modulator 215 modulates the 200 MHz signal to include the ID 220. In one embodiment, the control logic 130 instructs the modulator 215 to modulate only the 200 MHz signal but not any of the other received signals (e.g., the 900 MHz signal). Because the tag reader 105 generating the 200 MHz receives the valid ID 220, this reader 105 knows it is the closest reader 105 to the tag 115.

In another embodiment, the logic 130 may instruct the modulator 215 to modulate the 200 MHz signal to include the ID 220 and modulate the 900 MHz signal to include different data informing the tag reader 105 transmitting the 900 MHz that is not the closest tag reader. For example, the data sent to this tag reader 105 may be a predefined code indicating to the reader 105 it is not the closest reader 105. In one embodiment, the predefined code may include the ID 220 as well also as additional data indicating to the reader 105 transmitting at 900 MHz that another reader 105 is closer to the tag 115. By receiving this code, the tag reader 105 can still identify the tag 115 (and the associated user or product) using the ID 220, but also determine that another tag reader 105 is closer to the tag 115.

In one embodiment, the receivers 120, transmitter 125, comparator 225 and control logic may be embodied in an IC on the tag 115. For example, the tag 115 may include an integrated circuit that includes the circuitry for performing the functions recited above. Moreover, the tag 115 may include a combination of digital and analog circuitry.

Figure 3:
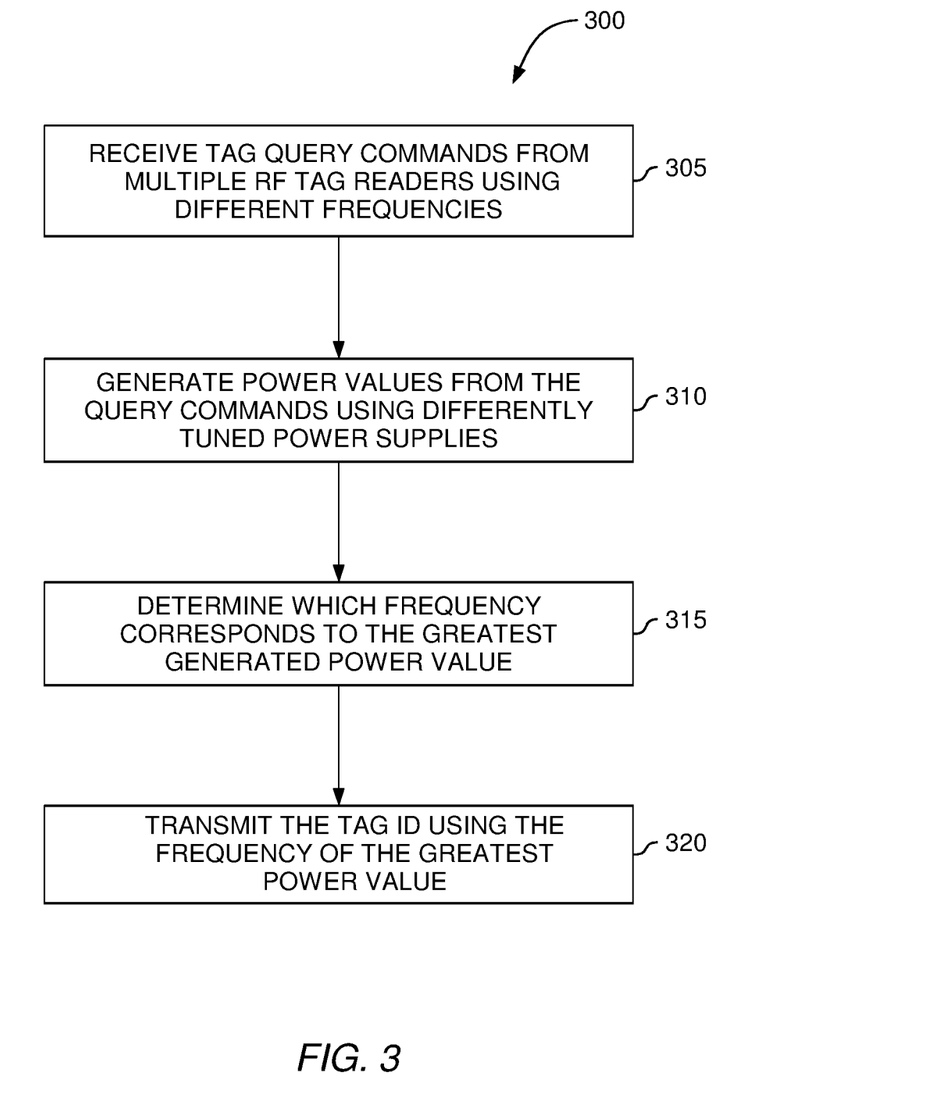
FIG. 3 is a flow chart for generating location information by comparing power values corresponding to multiple frequencies, according to one embodiment disclosed herein.

FIG. 3 is a flow chart of a method 300 for generating location information by comparing power values corresponding to multiple frequencies, according to one embodiment disclosed herein. At block 305, the RFID tag receives tag query commands (e.g., RFID signals) from multiple RFID tag readers using different frequencies. In one embodiment, the RF system is configured such that each RFID tag reader transmits the tag query commands using a unique frequency or non-overlapping range of frequencies. As such, each frequency can be correlated to exactly one tag reader.

As above, the RFID tag may include multiple receiver circuits that are tuned to the different frequencies transmitted by the tag readers.

At block 310, the RFID tag generates power values from the query commands using differently tuned power supplies in the receivers. In one embodiment, each of the receivers generates a power value (i.e., an indicator of signal strength) corresponding to one of the frequencies. For example, the receiver may include a charge pump that uses the signals received from the tag readers to generate a voltage or current for powering the internal components in the RFID tag—i.e., to activate the tag. However, if the RFID tag is an active or semi-passive tag, the power value generated by the receivers may not be used to power internal components. Rather, a separate power source in the RFID tag may be used to power the tag and transmit reply messages to the tag readers.

At block 315, control logic in the RFID tag determines which frequency corresponds to the greatest generated power. In one embodiment, the control logic uses the power values (which are directly or indirectly correlated to the received power) to select one of the frequencies transmitted by the tag readers. The control logic determines that the tag reader emitting the frequency corresponding to the highest power value is the closest tag reader.

At block 320, the control logic instructs the modulator to transmit the tag ID using the frequency that generates the greatest power value which corresponds to the closest tag reader. Put differently, when backscattering the received signals, the RFID tag selectively modulates only certain frequencies to include its ID. Doing so informs the tag readers receiving the modulated signals whether it is the closet tag reader. In one example, if a tag reader is capable of transmitting and receiving only 900 MHz signals but the RFID tag modulates the backscattered signal at 200 MHz, then this tag reader cannot identify or detect the RFID tag. In contrast, a tag reader that transmits and receives signals at 200 MHz will detect the RFID tag, and by so doing, determine it is the closest tag reader to the tag. By selectively modulating the signal transmitted to the tag readers, the RFID tag conveys location information to one or more of the readers indicating which reader is closest to the tag.

Figure 4A:
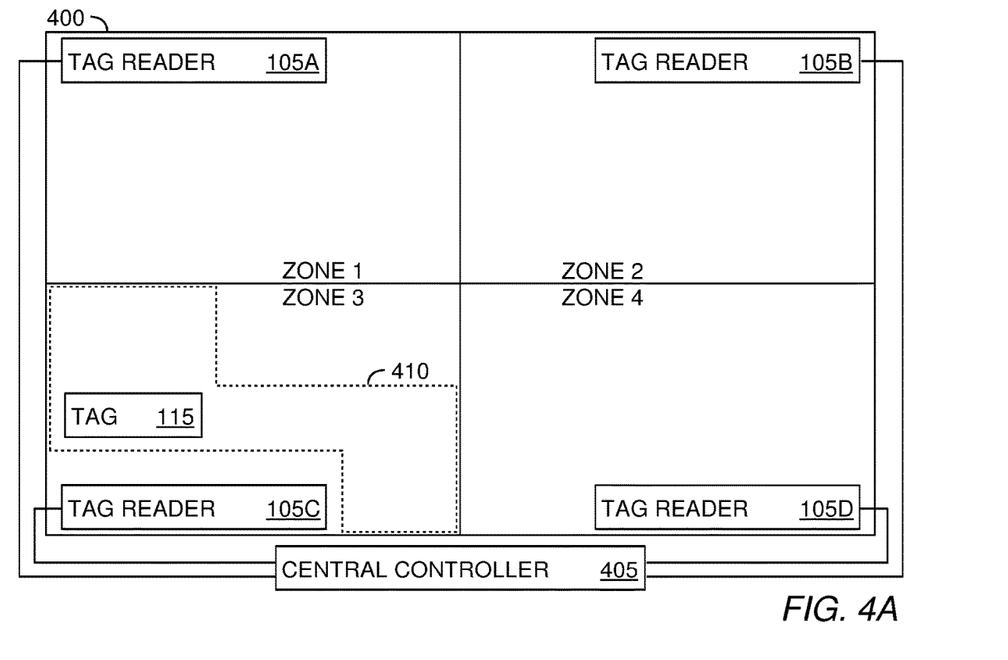
FIGS. 4A and 4B illustrate an RFID system for determining a location of an RFID tag, according to one embodiment disclosed herein.
Figure 4B:
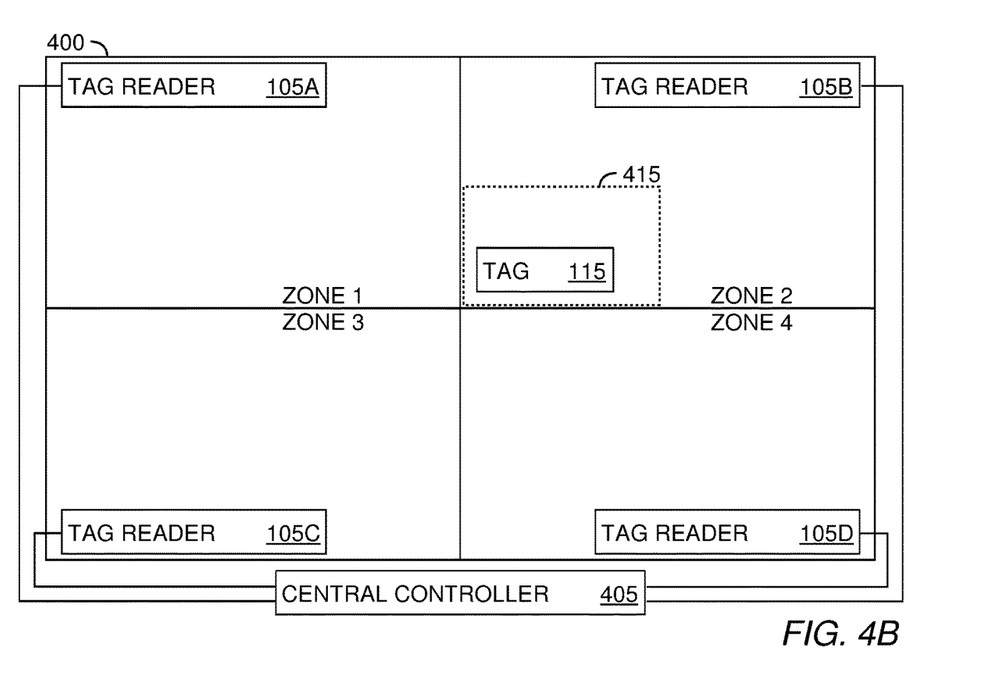

FIGS. 4A and 4B illustrate an RFID system for determining a location of an RFID tag, according to one embodiment disclosed herein. The RFID system includes a geographic area 400 that is defined into different zones (Zone 1-4) that are respectively assigned to a tag reader 105. In one embodiment, the zones represent regions in the geographic area 400 where the strength of the signals transmitted by the respective tag readers 105 is greater than the signal strength of the other three tag readers 105. For example, when configuring the RFID system, a technician may walk the area 400 using a sensor to identify the zones (i.e., regions) where the respective signal strengths are the highest. Although shown here as rectangles, this is a simplification of the zone since in a real world application the zones would likely have non-linear boundaries. Moreover, the technician may adjust the output power of the tag readers 105 so that the signal strength establish zones with the desired boundaries—e.g., zones with equal sized areas or zones that cover certain locations or features in the area 400.

The geographic area 400 may be an indoor facility such as a warehouse or store, or an outdoor area such as a parking lot, amusement park, port, and the like. For example, the tag readers may be mounted to the roof of a warehouse to monitor inventory using the RFID tags, or the tag readers may be placed on poles in a parking lot to monitor cars in the lot. Moreover, the tag readers 105 do not need to be stationary but instead could move around in the area 400 which may cause the zones to adjust accordingly. For example, a central controller 405 may detect that tag reader 105A has moved to change the boundary of Zone 1 and update the boundaries of all the zones accordingly.

In FIG. 4A, the tag 115 is located within Zone 3 which means the signal outputted by tag reader 105C has the greatest strength. Even though tag 115 is in Zone 3, the tag 115 may receive tag query commands (or other commands) from tag readers 105 in other zones. For example, the tag 115 may receive commands from tag readers 105A, 105C, and 105D, but not from tag reader 105B which may be too far away. The tag readers 105 may transmit RFID commands using four different frequency or frequency ranges. As such, the tag 115 may include four different receivers that are each tuned to one of the frequencies used by the tag readers 105. Continuing the previous example, the three receivers in tag 115 corresponding to the frequencies outputted by tag readers 105A, 105C, and 105D would detect RFID commands while the signal outputted by tag reader 105B may be too faint to be detected. As above, the receivers each output a power value indicating the signal strength of the corresponding frequencies. A comparator on the tag 115 determines which signal is the strongest at the location of the tag 115, which, in this case is tag reader 105C. As such, the tag 115 selectively modulates the signal transmitted by the tag reader 105C to generate a reply message that includes the tag ID.

The tag readers 105 may be able to receive reply messages from the tag 115 on more frequencies than the frequencies at which the readers 105 transmit. In one embodiment, the tag readers 105 may be able to receive messages at all the frequencies used by the other readers 105 to transmit commands to the tag 115. For example, tag readers 105A, 105C, and 105D may receive the reply message transmitted by the tag 115 at the frequency outputted by tag reader 105C. However, because the modulation frequency used by the tag 115 is different than the transmission frequency used by tag readers 105A and 105D, these readers 105 determine that the tag 115 is not within their corresponding zones—i.e., zones 1 and 4. This determination may occur using logic on the tag readers 105 or may be decided by the central controller 405 which is coupled to all the tag readers 105. For example, the tag readers 105 may transmit received responses to the central controller 405 which determines which zone the tag 115 is located.

Moreover, the central controller 405 may use the fact that the tag readers 105A and 105D receive reply messages from the tag, while tag reader 105B does not, to further narrow down the location of the tag 115. Because the tag reader 105C receives the reply message from the tag 115 at the frequency it transmits, the central controller 405 knows the tag 115 is in Zone 3. But because the tag readers 105A and 105D also receive reply messages but tag reader 105B does not, the central controller 405 can further narrow down the location of the tag 115 to a sub-portion of the zone (referred to herein as quadrants of a zone). Put differently, the central controller 405 can use the knowledge that neighboring tag readers 105 receive, or do not receive, the reply message to divide each zone into quadrants or sub-portions.

In one embodiment, each zone may be divided into quadrants that correspond to a particular combination of the tag readers 105 that do or do not receive reply messages from the tag 115. For example, quadrant 410 corresponds to when tag readers 105A and 105D receive the reply message but tag reader 105B does not. However, if all three tag readers 105A, 105B, and 105D received the reply message, then the corresponding quadrant may be the upper right hand corner of Zone 3. If only tag reader 105C receives the reply message, the corresponding quadrant may be the lower left corner of Zone 3. Other quadrants in Zone 3 may correspond to other combinations such as if only tag reader 105A and 105C receives the reply message or if only tag readers 105D and 105C receive the message. In one embodiment, the different quadrants in the zones may overlap—e.g., the quadrant 410 corresponding to when tag readers 105A and 105D receive the reply message may overlap with the quadrant corresponding to when only reader 105A receives the reply message.

In another embodiment, instead of using quadrants to narrow down the location of the tag 115, the central controller 405 may use the information captured by the tag readers 105 to determine the location of the tag 115 within Zone 3. For example, the central controller 405 may use the knowledge of which tag reader 105 receives the reply message (and which do not) to perform triangulation or other spatial location techniques to determine the location of the tag 115.

Alternatively, each of the tag readers 105 may receive reply messages only at the frequency at which the reader 105 transmits. In this embodiment, even if the reply message backscattered by the tag 115 reaches tag readers 105A or 105D, these readers are unable to detect the message. Thus, only tag reader 105C would receive the message thereby indicating to the central controller 405 that the tag 115 is in Zone 3. However, because the other readers 105 cannot detect the message, the central controller 405 may, if desired, rely on other location techniques to narrow down the location of the tag 115 in Zone 3.

In one embodiment, the tag readers 105 may use the knowledge of which quadrant contains the RFID tag 115 to improve the accuracy of other location detection techniques. As explained above, because the tag 115 transmits a reply message using the transmission frequency of tag reader 105C, this indicates to tag reader 105C that the tag 115 is located in Zone 3. The tag reader 105C can also perform another location detection technique such as measuring the received power of the reply message or measuring its time of flight of the reply message. These techniques may identify how far away the tag 115 is from the tag reader 105C in Zone 3, thereby further narrowing down the location of the tag 115. Because the tag reader 105C already knows the tag 115 is in Zone 3, the reader 105C can ignore multi-path signals which may be received from other zones in the geographic area 400—i.e., Zones 1, 2, or 4. Ignoring multi-path signals received from other zones may improve the accuracy of location detection techniques used when processing the reply messages transmitted by the tag 115.

In FIG. 4B, the tag 115 has moved into Zone 2 which corresponds to tag reader 105B. Stated differently, the receiver in tag 115 corresponding to the frequency transmitted by tag reader 105B outputs the highest power value. In response, the tag 115 modulates the reply message at the same frequency transmitted by the tag reader 105B, thereby indicating to tag reader 105B (and the central controller 405) that the tag 115 is closest to it. In this manner, the central controller 405 determines that tag 115 has moved from Zone 3 to Zone 2.

Like in FIG. 4A, the central controller 405 may also determine a particular quadrant 415 in Zone 2 that includes the tag 115. For example, the reply message backscattered by the tag 115 may be received by tag readers 105A, 105C, and 105D in addition to reader 105B. Because this information is forwarded to the central controller 405, the controller 405 determines the tag 115 is within quadrant 415— i.e., the lower left corner of Zone 2.

In one embodiment, an interfering object may be between the closest tag reader (reader 105B in this case) and tag 115. This object may reflect some or all of the signal emitted from the tag reader 105B to the tag 115, thereby reducing the power value generated by the corresponding receiver in the tag 115. As such, the tag 115 may erroneously determine its location is closer to a different tag reader. In one embodiment, the central controller 405 may time average the location information collected by the tag readers 105 before assigning the tag 115 to a particular zone. For example, the interfering object (or the tag 115) may be moving in which case a drop in power value caused by the object may be only temporary. In one example, the interfering object may be a forklift navigating the geographic area 400 which temporary blocks much of the signal transmitted by tag reader 105B from reaching tag 115. The central controller 405 may evaluate multiple reply messages backscattered from the tag 115 before assigning the tag 115 to a zone. For example, while the forklift moves between tag 115 and tag reader 105B, the backscattered reply messages may erroneously indicate the tag 115 is in Zone 1. However, once the forklift is no longer interfering with the signal, then the tag 115 may determine tag reader 105B is the closest reader and generate reply messages correctly indicating that the tag 115 is in Zone 2. Thus, the central controller 405 may evaluate reply messages using, for example, a one to five minute interval when assigning the tag 115 to a zone.

Moreover, when the tag 115 moves in the area 400, different locations may cause the signals transmitted by the tag readers 105 to constructively or destructively interfere (i.e., cause dead spots). Thus, even if the tag 115 is in Zone 2, it may be located at a dead spot where the signals transmitted by tag reader 105B (which may include multi-paths signals) destructively interfere at the current location of the tag 115. As such, time averaging the reply messages backscattered by the tag 115 may enable the central controller 405 to ignore times when the tag 115 passes through a dead spot in Zone 2. Alternatively, tag 115 may pass through a point in Zone 2 where the signals transmitted by tag reader 105D (which corresponds to Zone 4) constructively interfere, which causes the power value measured by the receiver in tag 115 corresponding to reader 105D to jump. In some cases, the constructive interference may cause the power value corresponding to tag reader 105D to be greater than the power value corresponding to tag reader 105B even though tag 115 is in Zone 2 and not Zone 4. Time averaging the rely messages sent by the tag 115 may also be helpful to identify locations of constructive interference where signals from tag readers 105 are artificially increased within zones corresponding to different tag readers 105.

In one embodiment, the RFID system may periodically shift the locations of the tag readers 105 to different locations which changes the points of constructive and destructive interference in the zones. Doing so which may help in the situation where a tag 115 is stationary at point of constructive or destructive interference in a zone. Even slight changes in the location or orientation of the tag readers 105 can move the locations of constructive and destructive interference in the area 400. As such, the central controller 405 may change the locations of constructive and destructive interference without having to make large changes in the current location of the tag readers 105, thereby keeping the boundaries of the zones substantially unchanged.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A radio frequency identification (RFID) tag comprising:
    at least one receiver configured to receive a first RFID signal comprising a first frequency and a second RFID signal comprising a second frequency; and
    logic configured to:
        select, in response to receiving the first and second RFID signals, one of the first and second frequencies by determining which of the first or second RFID signal has the greater signal strength, and
        output a reply message comprising a tag ID using the selected frequency.

2. The RFID tag of claim 1, wherein the selected frequency is the first frequency, and wherein the reply message is not modulated using the second frequency.

3. The RFID tag of claim 1, wherein the first RFID signal is a tag query command transmitted by a first tag reader and the second RFID signal is a tag query command transmitted by a second tag reader.

4. The RFID tag of claim 1, wherein the first RFID signal comprises a frequency range that does not overlap with a frequency range of the second RFID signal.

5. The RFID tag of claim 1, wherein outputting the reply message comprises:
    modulating the selected frequency to include an ID corresponding to the RFID tag.

6. The RFID tag of claim 1, wherein the at least one receiver comprises at least one power supply.

7. The RFID tag of claim 1, wherein the RFID tag is a passive tag.

8. The RFID tag of claim 1, further comprising:
    a first receiver of the at least one receiver tuned to the first frequency; and
    a second receiver of the at least one receiver tuned to the second frequency, wherein the first receiver cannot detect the second RFID signal and the second receiver cannot detect the first RFID signal.

9. A method of operating a RFID tag, the method comprising:
    receiving a first RFID signal at the RFID tag at a first frequency;
    receiving a second RFID signal at the RFID tag at a second frequency;
    selecting one of the first and second RFID signals based on which has a greater signal strength; and
    transmitting a reply message from the RFID tag using a frequency corresponding to the selected RFID signal.

10. The method of claim 9, wherein the first RFID signal is a tag query command transmitted by a first tag reader and the second RFID signal is a tag query command transmitted by a second tag reader.

11. The method of claim 9, wherein the first RFID signal comprises a frequency range that does not overlap with a frequency range of the second RFID signal.

12. The method of claim 9, wherein transmitting the reply message comprises:
    modulating the selected RFID signal to include an ID corresponding to the RFID tag.

13. The method of claim 9, wherein the RFID tag includes at least one receiver configured to receive the first and second RFID signals, wherein the receiver comprises at least one power supply.

14. The method of claim 9, further comprising:
    powering a component in the RFID tag using a power supply.

15. The method of claim 9, wherein the RFID tag includes a first receiver tuned to the first frequency and a second receiver tuned to a second frequency, wherein the first receiver cannot detect the second RFID signal and the second receiver cannot detect the first RFID signal.

16. An RFID tag, comprising:
    a first receiver tuned to receive a first RFID signal;
    a second receiver tuned to receive a second RFID signal, wherein the first and second receivers are tuned to different frequencies;
    a comparator configured to determine which of the first and second RFID signals has a greater signal strength; and
    a transmitter configured to transmit a reply message using a frequency corresponding to the first or second RFID signal with the greater signal strength.

17. The RFID tag of claim 16, wherein the first RFID signal is a tag query command transmitted by a first tag reader and the second RFID signal is a tag query command transmitted by a second tag reader.

18. The RFID tag of claim 16, wherein the first RFID signal comprises a frequency range that does not overlap with a frequency range of the second RFID signal.

19. The RFID tag of claim 16, further comprising:
    a modulator configured to modulate the first or second RFID signal with the greater signal strength to include an ID corresponding to the RFID tag.

20. The RFID tag of claim 16, wherein the first and second receivers each comprises a power supply that generates respective power values which the comparator uses to determine which of the first and second RFID signals has the greater signal strength.

* * * * *